United States Patent [19]
Carothers, Jr.

[11] 3,732,039
[45] May 8, 1973

[54] FUEL CONTROL VALVE

[75] Inventor: Frank S. Carothers, Jr., Anderson, Ind.

[73] Assignee: General Motors Corporation, Detroit, Mich.

[22] Filed: Nov. 24, 1971

[21] Appl. No.: 201,741

[52] U.S. Cl. ..................417/300, 137/116, 137/117
[51] Int. Cl. ........................F04b 49/00, G05d 11/00
[58] Field of Search.............................137/116, 117; 417/293, 300

[56] References Cited

UNITED STATES PATENTS 2,937,656  5/1960  Evans et al. ...................137/117 X
3,017,922  1/1962  Peterson.......................137/117 X
3,572,365  3/1971  White..........................137/117

Primary Examiner—Martin P. Schwadron
Assistant Examiner—David J. Zobkiw
Attorney—Paul Fitzpatrick et al.

[57] ABSTRACT

A valve arrangement for controlling flow of fuel from a positive-displacement pump to an engine such as a gas turbine, the control being exerted by an electric current which biases a pilot valve to regulate a control pressure. The control pressure and pressure of metered fuel act in opposition on a metering valve so that the pressure of fuel delivered to the engine is determined by the control pressure and thus by the electric current. Metered fuel pressure and pump outlet pressure control a by-pass valve which returns excess fuel to the pump inlet. The entire control arrangement preferably is integrated into a compact assembly.

4 Claims, 5 Drawing Figures

PATENTED MAY 8 1973 3,732,039
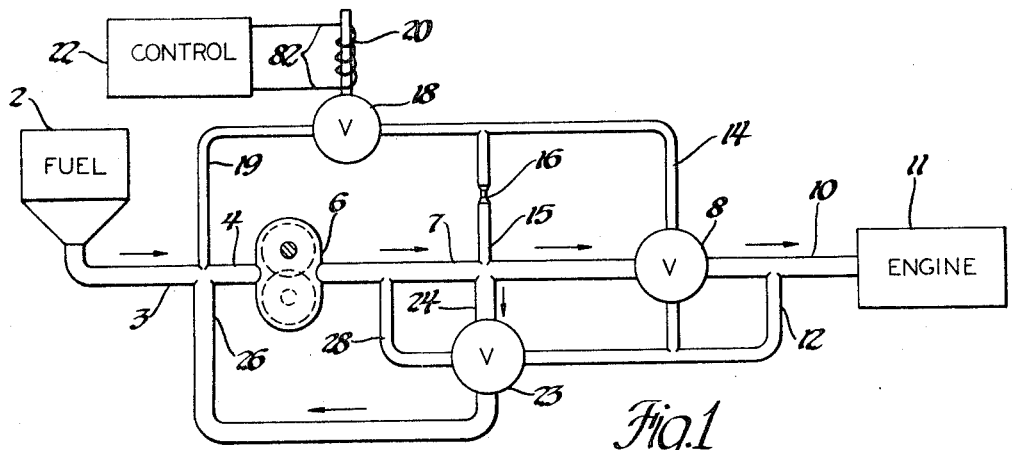
Fig.1
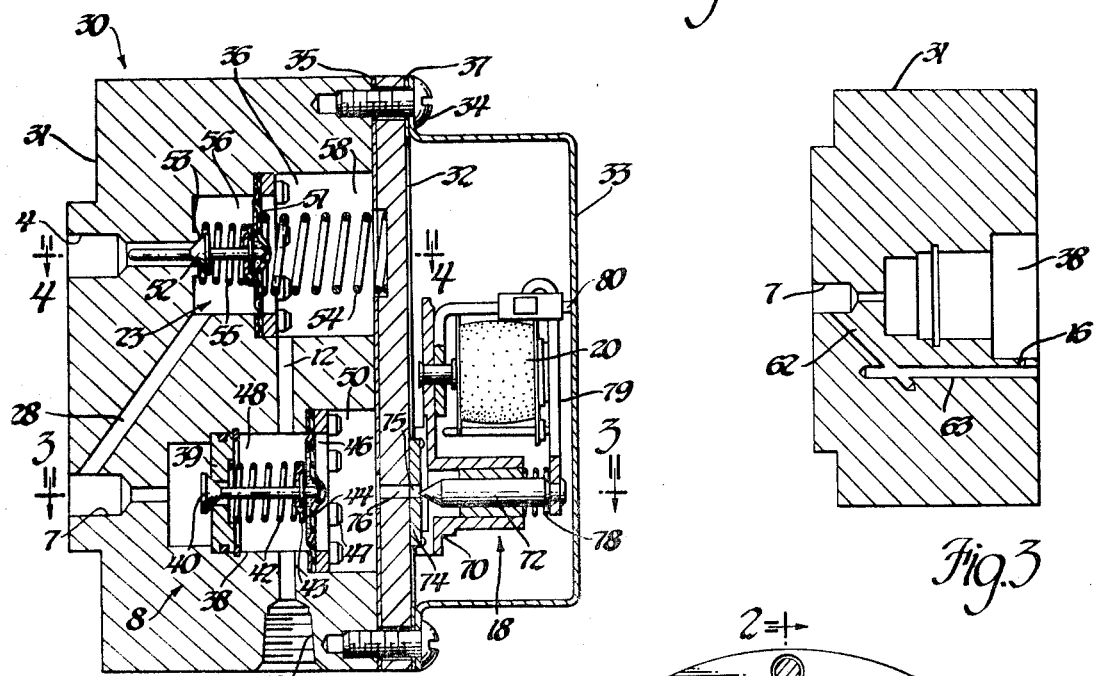
Fig.2
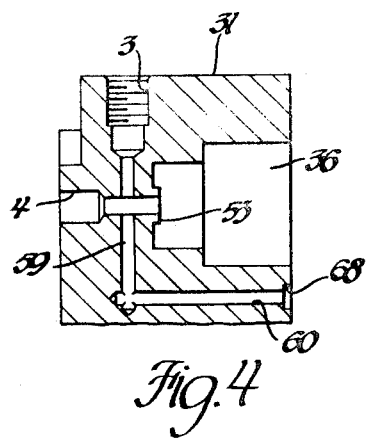
Fig.3
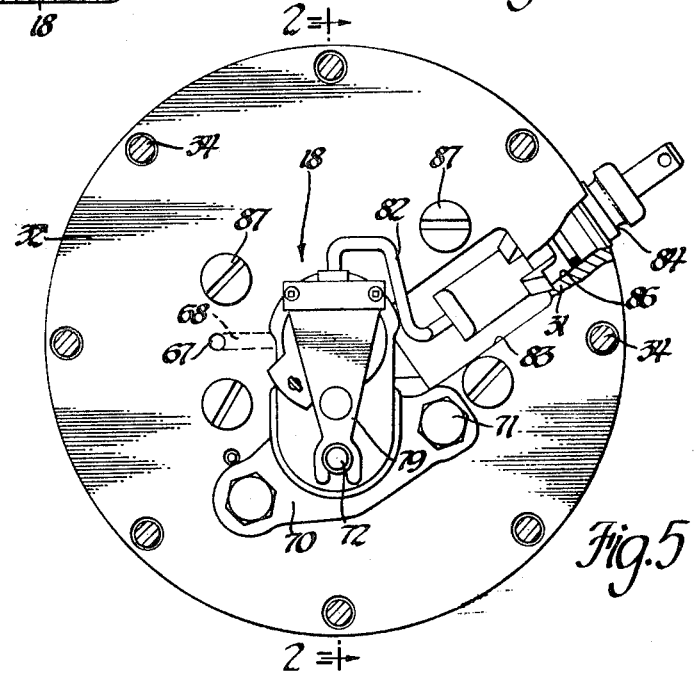
Fig.4
Fig.5

FUEL CONTROL VALVE

My invention is directed to means for controlling flow of fluid and more particularly to apparatus by which flow of fuel to a gas turbine or other engine may be controlled by the magnitude of an electric current.

Most known fuel controls for gas turbine engines are of a hydromechanical or pneumatic type, but there are some control systems which involve extensive electrical or electronic devices of the general nature of analog computers or governing controls to regulate fuel flow to the engine. There must be an interface between the electrical apparatus and a valve which controls flow of fuel to the engine.

My invention is concerned with an improved mechanism for this purpose, specifically one by which a rather small current flowing through a solenoid biases a pilot valve which thus variably regulates a control pressure, this control pressure in turn setting, through the operation of a metering valve, the pressure of the fuel which is delivered to the engine.

The principal objects of the invention are to improve fuel control systems and the like and to provide improved means for controlling pressure or flow of a liquid by the use of an electrical current signal.

The nature of my invention and its advantages will be clear to those skilled in the art from the succeeding detailed description of the preferred embodiment of the invention and the accompanying drawings thereof.

FIG. 1 is a schematic diagram illustrating the nature of the control apparatus.

FIG. 2 is a sectional view of an electrically controlled valve assembly taken on the plane indicated by the line 2—2 in FIG. 5.

FIG. 3 is a partial sectional view of the valve body taken on the plane indicated by the line 3—3 in FIG. 2.

FIG. 4 is a partial sectional view of the valve body taken on the plane indicated by the line 4—4 in FIG. 2.

FIG. 5 is an elevation view with a cover removed and parts cut away.

Referring first to FIG. 1, a liquid fuel is stored in a tank 2 from which it flows through a line 3 to the inlet 4 of a pump 6, indicated as a gear pump. The fuel may be pressurized by a boost pump (not illustrated). Pump 6 discharges through an outlet line 7, a metering valve 8, and a fuel outlet line 10 to an engine 11. The control is specifically designed for an engine of the gas turbine type but, of course, may have other applications.

As illustrated in FIG. 1, a control line 12 supplies the fuel outlet pressure to the valve 8, this pressure tending to close the valve. The metering valve 8 also responds to a regulated pressure line 14, this pressure being derived from the pump through a branch line 15 from the pump outlet 7 and an orifice or restricted conduit 16 connecting lines 15 and 14. Line 14 also is connected to a pressure regulating pilot valve 18 which may allow fuel to bleed from line 14 into a drain line 19 to the pump inlet. Flow through valve 18 creates a pressure drop through orifice 16 and thus varies the pressure in line 14.

Valve 18 is controlled by a solenoid 20 energized from a suitable electrical control mechanism 22. This control mechanism may be of any suitable type. Ordinarily, it will include means for transmitting a current to the solenoid which is determinative of the pressure of fuel to be supplied to the engine to run the engine at the desired power level. Thus, this voltage might be basically under control of a foot accelerator pedal in an automotive vehicle, for example. Of course, such controls also ordinarily include means to limit or control fuel to prevent over-temperature or overspeed of the engine and to limit fuel during acceleration to avoid compressor surge; also to prevent fuel flow from dropping below a minimum for any particular engine operating condition to prevent flameout. The details of the control mechanism 22 are immaterial to our invention, may take any desired form and, therefore, will not be further described.

The remaining principal element of the control is a by-pass valve 23 which acts to regulate the head on the metering valve 8 and to return to the pump inlet fuel delivered by the pump in excess of engine requirements. Valve 23 has an inlet through a branch line 24 from the pump outlet and discharges into a return line 26 to the pump inlet. Valve 23 is biased in the closing direction by fuel outlet pressure in branch 12 from the fuel outlet line 10. It is biased to open by pressure in a branch line 28 from the pump outlet line 7; thus it responds to the pressure drop across metering valve 8.

The operation of the system will be taken up after a description of the preferred physical embodiment of the valve assembly.

Referring to FIGS. 2 through 5, the fuel control valve assembly 30 comprises a body or valve block 31 and a cover plate 32 fixed to the valve body. Cover plate 32 and a cover 33 enclosing valve 18 are fixed to the body by screws 34, gaskets 35 and 37 being disposed between the cover plate and the body and cover, respectively. Two stepped bores in the body perpendicular to the cover plate 32 define two valve cylinders 36 and 38, cylinder 36 housing the by-pass valve 23 and cylinder 38 the metering valve 8.

Considering first the metering valve 8, this comprises a seat 39 retained in the cylinder 38 by a snap ring and sealed by an O-ring, and a valve poppet 40 engaging the seat under the influence of a light spring 42. Spring 42 bears against a retainer 43 fixed to the stem of poppet 40 and the end of the stem bears against a flexible diaphragm 44 lodged against a step in the cylinder 38. The diaphragm may be sealed by a gasket and is clamped against the shoulder by a ring 46 and screws 47. Spring 42 provides a small force (for example, about one pound) biasing the valve closed. The diaphragm 44 divides the cylinder 38 into two chambers, a chamber 48 pressure in which tends to close the valve 8 and a chamber 50 pressure in which tends to open the valve.

Considering now by-pass valve 23, the cylinder 36 mounts a diaphragm 51 supported similarly to diaphragm 44. A poppet 52 engages the diaphragm and an annular seat 53 at one end of the cylinder 36. Valve 23 is biased to close by a relatively strong compression spring 54 which engages in a recess in cover plate 32. A light spring 55 acts to hold the poppet 52 in engagement with diaphragm 51. Diaphragm 51 divides cylinder 36 into a chamber 56 in which pressure tends to open the by-pass valve and a chamber 58 in which pressure tends to close the valve. Cylinder 36 communicates through pump inlet connection 4 with the inlet of pump 6 and cylinder 38 communicates with the pump outlet through connection 7. The specific structure is adapted for direct mounting of the valve assembly on the pump, but this is immaterial to the invention here described.

The fuel outlet connection 10 of FIG. 1 is shown in FIG. 2 and the inlet connection 3 from the tank is shown in FIG. 4. Outlet 10 connects directly with chamber 48 and through a drilled control line 12 in the valve block to the chamber 58. Pump outlet connection 7 is connected through line 28 in the valve body with chamber 56 of the by-pass valve.

Referring to FIG. 4, a drilled passage 59 in the valve block connects tank connection 3 with pump inlet connection 4. A second drilled passage 60 intersects passage 59 and extends through the face of the valve block. Referring to FIG. 3, two intersecting drilled passages 62 and 63 lead from pump outlet 7 through a very small drilled orifice 16, about 0.02 inch in diameter, into the chamber 50 of the metering valve. Passage 63 is closed beyond the orifice by gasket 35 or by plugging.

The pilot valve assembly 18 is mounted on cover plate 32 and is enclosed by the stamped sheet metal cover 33. The space within the cover 33 contains fuel at tank or boost pump pressure which is vented through a small hole 67 in the cover plate which connects through a slot 68 in the face of the valve body with the drain passage 60, 59. The valve assembly 18 includes a frame or housing 70 which is fixed to the cover plate 52 by cap screws 71. The housing includes a guide for a valve plunger 72 which is biased by the solenoid or coil 20. Plunger 72 cooperates with an annular valve seat disk 74 which is clamped between the housing 70 and the cover plate 32. Disk 74 has a central circular hole 75 which overlies a hole 76 extending through the cover plate 32 into the chamber 50 of the metering valve, thus corresponding in part to the line 14 of FIG. 1. A very light compression spring 78 (above one-half ounce force) biases the plunger in the direction to open the valve. An armature 79 hinged on a post 80 is magnetically attracted by energization of solenoid 20 to bias the plunger into engagement with the seat. The seat is of small diameter, about 0.070 inch so that the fuel pressure force exerted on the plunger 72 is relatively small. The magnetic force on plunger 72 tends to close the regulating valve 18 and opposes pressure tending to escape from the chamber 50 to which it is supplied through the orifice 16 by the pump. When the force exerted by the fluid on the plunger is less than that due to the solenoid 20 and spring 78, the valve closes except for immaterial slight leakage. Whenever the pressure force exerted on the valve plunger through hole 75 exceeds the force exerted by the solenoid and spring, the valve opens to bleed fluid out and thus maintain the pressure in chamber 50 at a value which is proportional to the pull exerted by the solenoid. The magnetic structure is such that the displacement of the armature is very slight and force is substantially directly proportional to current flowing in coil 20. Thus, control of this current by the control device 22 determines pressure in chamber 50. Variations in pump outlet pressure will not affect this relation. Incidentally, it may be advantageous in some cases to mount the valve assembly so that plunger 72 is vertical to minimize friction there.

As shown in FIG. 5, the solenoid is energized through a pair of leads 82 which extend through an opening 83 in the cover into a corresponding recess in the valve body. External connections are made by a connector 84 fixed in a cylindrical bore 86 in the valve body and sealed by an O-ring.

Screws 87 shown in FIG. 5 additionally hold cover plate 32 to the valve body, resisting fuel pressure within the valve cylinders.

OPERATION

Considering the operation of the valve system, let us assume that the engine is a gas turbine and that it is beginning to be cranked by a starter, and that the pump 6 is geared to the engine or starter. Fuel will flow from the tank 2 through connection 3, 4 to the pump and from the pump through connection 7 to valve 8, which is held closed by spring 42, and through passage 28 to the chamber 56 of valve 23, which is held closed by spring 54. Pump discharge also flows through passages 62, 63 (FIG. 3) and orifice 16 into chamber 50 of metering valve 8. If we assume no current is fed to solenoid 20, regulating valve 18 will be open and pressure will not build up in chamber 50, the fuel being bled off through valve 18 and returned to the pump inlet through the drain 67, 68, 59 (FIGS. 5 and 4).

As cranking speed increases, the discharge of pump 6 increases and becomes much more than can be bled through orifice 16. At some point before lightoff, this pressure builds up to a point at which the pressure in chamber 56 overcomes the minimal pressure in chamber 58, causing by-pass valve 23 to open and discharge excess fuel to the pump inlet. The constants of the by-pass valve are preferably such that the pump outlet pressure is maintained at about 35 psi above fuel pressure in line 10, chamber 48, and chamber 58. Too high a metering head unduly loads the pump, and too low a metering head slows response of the metering valve to transients.

When it is desired to supply fuel to the engine for lightoff, solenoid 20 is energized by an appropriate control to close valve 18 and allow pressure to build up in chamber 50. This opens valve 8 and fuel flows into chamber 48 and out through connection 10 to the engine. Pressure in chamber 48 tends to close the valve and, because of spring 42, a pressure differential of about 1 psi in chamber 50 over chamber 48 is required to open the valve. The current flowing through solenoid 20 determines the force with which plunger 72 of valve 18 is urged against the opening of 75 of the valve and therefore the pressure at which the fuel in chambers 50 and 58 is maintained. The metered fuel pressure is thus maintained at about one psi below this value and, if it tends to become excessive, will simply increase the rate of bleed from chamber 50 to reduce the pressure and reduce the flow area of valve 8.

This pressure differential of about 35 psi controlled by valve 23 provides a constant head across the metering valve 8 in normal operation. This is exerted over the area of the opening in valve seat 39, which is not very considerable. The metering valve is controlled almost entirely by the pressure in chamber 50 as opposed by the feedback pressure in chamber 48. During lightoff, acceleration, or normal operation of the engine, the control 22, responding to whatever factors are appropriate, determines the current fed to solenoid 20, thereby the pressure in chamber 50, 48 and pressure of fuel fed to the engine. If fuel flow is excessive or insufficient, as reflected by engine speed or other control factor, this will affect the control to adjust the current in solenoid 20 as required.

It should be apparent to those skilled in the art from the foregoing that my invention provides a simple, compact, and reliable mechanism to direct fuel to an engine or other user at a desired variable pressure and to by-pass the excess delivery of the pump.

The detailed description of the preferred embodiment of the invention for the purpose of explaining the principles thereof is not to be considered as limiting or restricting the invention, since many modifications may be made by the exercise of skill in the art.

I claim:

1. A fuel supply and control system comprising, in combination, a positive-displacement pump having an inlet and an outlet, a fuel outlet, a pressure-differential-operated throttling valve controlling flow from the pump outlet to the fuel outlet, means responsive to fuel outlet pressure biasing the throttling valve to close, conduit means including an orifice and a variably controllable pressure-regulating pilot valve connecting the pump outlet to the pump inlet, means responsive to the regulated pressure between the orifice and the pilot valve biasing the throttling valve to open, a pressure-differential-operated pump by-pass valve connected between the pump outlet and the pump inlet, means responsive to fuel outlet pressure biasing the by-pass valve to close, and means responsive to pump outlet pressure biasing the by-pass valve to open, such that fuel outlet pressure is a predetermined function of regulated pressure and the pump outlet pressure is maintained at a substantially constant differential above fuel outlet pressure.

2. A fuel supply and control system comprising in combination, a positive-displacement pump having an inlet and an outlet, a fuel outlet, a pressure-differential-operated throttling valve controlling flow from the pump outlet to the fuel outlet, means responsive to fuel outlet pressure biasing the throttling valve to close, conduit means including an orifice and a variably controllable pressure-regulating pilot valve connecting the pump outlet to the pump inlet, electric current responsive means controlling the pilot valve, means responsive to the regulated pressure between the orifice and the pilot valve biasing the throttling valve to open, a pressure-differential-operated pump by-pass valve connected between the pump outlet and the pump inlet, means responsive to fuel outlet pressure biasing the by-pass valve to close, and means responsive to pump outlet pressure biasing the by-pass valve to open, such that fuel outlet pressure is a predetermined function of the electric current, and the pump outlet pressure is maintained at a substantially constant differential above fuel outlet pressure.

3. A fluid flow regulating valve device comprising, in combination, a valve body defining two cylinders, a diaphragm in each cylinder dividing it into two chambers, a valve operated by movement of each diaphragm, a spring biasing each valve to close, an outlet connectable to a user and connected directly to the valve-closing chambers of both cylinders, an inlet for fluid under pressure connnected through one valve to the valve-closing chamber of the said one valve and connected directly to the valve-opening chamber of the other valve, a by-pass connected by the said other valve to a point of low pressure, means including an orifice and a pressure-regulating valve connected between the inlet and the by-pass for developing a variable control pressure, and means supplying the control pressure to the valve-opening chamber of the said one valve.

4. A fluid flow regulating valve device comprising, in combination, a valve body defining two cylinders, a diaphragm in each cylinder dividing it into two chambers, a valve operated by movement of each diaphragm, a spring biasing each valve to close, an outlet connectable to a user and connected directly to the valve-closing chambers of both cylinders, an inlet for fluid under pressure connected through one valve to the valve-closing chamber of the said one valve and connected directly to the valve-opening chamber of the other valve, a by-pass connected by the said other valve to a point of low pressure, means including an orifice and a pressure-regulating valve connected between the inlet and the by-pass for developing a variable control pressure, and means supplying the control pressure to the valve-opening chamber of the said one valve, the pressure-regulating valve including current-responsive means setting the controlled pressure level.

* * * * *